US010564425B2

(12) United States Patent
Bamberger et al.

(10) Patent No.: US 10,564,425 B2
(45) Date of Patent: Feb. 18, 2020

(54) PROCESSING A MEDIA CONTENT BASED ON DEVICE MOVEMENT

(71) Applicant: Snap Inc., Santa Monica, CA (US)

(72) Inventors: Alex Bamberger, Venice, CA (US); Matthew Hanover, Los Angeles, CA (US); Nathan Litke, Venice, CA (US); Michael Brian Murray, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/673,215

(22) Filed: Aug. 9, 2017

(65) Prior Publication Data
US 2018/0246329 A1 Aug. 30, 2018

Related U.S. Application Data

(60) Provisional application No. 62/464,183, filed on Feb. 27, 2017.

(51) Int. Cl.
*G02B 27/01* (2006.01)
*H04N 13/00* (2018.01)
(Continued)

(52) U.S. Cl.
CPC ....... *G02B 27/0172* (2013.01); *G02B 27/017* (2013.01); *G06F 1/1694* (2013.01);
(Continued)

(58) Field of Classification Search
CPC .. H04N 13/194; H04N 13/336; H04N 7/0122; H04N 5/23216; H04N 5/23238;
(Continued)

(56) References Cited

U.S. PATENT DOCUMENTS 6,038,295 A 3/2000 Mattes
6,980,909 B2 12/2005 Root et al.
(Continued)

FOREIGN PATENT DOCUMENTS

CA 2887596 A1 7/2015
EP 2348383 7/2011
(Continued)

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
(Continued)

*Primary Examiner* — Amare Mengistu
*Assistant Examiner* — Jennifer L Zubajlo
(74) *Attorney, Agent, or Firm* — Schwegman Lundberg & Woessner, P.A.

(57) ABSTRACT

Systems and methods provide for detecting movement of the computing device during playback of media content on a display of the computing device, receiving movement data from one or more sensors of the computing device, analyzing the movement data to determine a direction of movement, calculating a rotation of the display of the media content based on the direction of movement, and causing the display of the media content to rotate relative to the direction of movement to display a portion of the media content associated with the direction of movement.

20 Claims, 13 Drawing Sheets

(51) Int. Cl.
*G06F 1/16* (2006.01)
*G06T 3/40* (2006.01)
*H04N 7/01* (2006.01)
*H04N 13/194* (2018.01)
*H04N 13/366* (2018.01)
*G06F 3/0488* (2013.01)
*G03B 17/48* (2006.01)
*G06F 3/00* (2006.01)
*G06F 3/0484* (2013.01)
*H04N 5/232* (2006.01)

(52) U.S. Cl.
CPC .............. *G06T 3/40* (2013.01); *H04N 7/0122* (2013.01); *H04N 13/194* (2018.05); *H04N 13/366* (2018.05); *G02B 2027/014* (2013.01); *G02B 2027/0138* (2013.01); *G03B 17/48* (2013.01); *G06F 3/005* (2013.01); *G06F 3/0484* (2013.01); *G06F 3/0488* (2013.01); *H04M 2250/22* (2013.01); *H04N 5/23216* (2013.01); *H04N 5/23238* (2013.01)

(58) Field of Classification Search
CPC ........ G02B 27/0172; G02B 2027/0138; G06T 3/40; G06F 1/1694; G06F 3/0488; G06F 3/0484; G06F 3/005; G03B 17/48; H04M 2250/22
See application file for complete search history.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,437,038 B1* | 9/2016 | Costello ................ G06T 15/08 |
| 9,443,227 B2 | 9/2016 | Evans et al. |
| 9,489,661 B2 | 11/2016 | Evans et al. |
| 9,491,134 B2 | 11/2016 | Rosen et al. |
| 2009/0251594 A1 | 10/2009 | Hua et al. |
| 2011/0157017 A1* | 6/2011 | Webb ................ A63F 13/06 345/158 |
| 2011/0202598 A1 | 8/2011 | Evans et al. |
| 2011/0231797 A1* | 9/2011 | Huhtala ............... G06F 1/1626 715/811 |
| 2011/0234475 A1* | 9/2011 | Endo .................... G02B 27/017 345/8 |
| 2011/0298824 A1* | 12/2011 | Lee ......................... G06F 3/011 345/633 |
| 2012/0209924 A1 | 8/2012 | Evans et al. |
| 2013/0205244 A1* | 8/2013 | Decker .................. G06F 17/21 715/777 |
| 2013/0329113 A1* | 12/2013 | Takatsuka .......... H04N 5/23293 348/333.12 |
| 2014/0101578 A1 | 4/2014 | Kwak et al. |
| 2014/0146205 A1* | 5/2014 | Xu ..................... H04N 5/23267 348/239 |
| 2014/0245367 A1 | 8/2014 | Sasaki et al. |
| 2014/0293087 A1 | 10/2014 | Brandt et al. |
| 2015/0085621 A1* | 3/2015 | Hong ................... G04G 21/00 368/10 |
| 2015/0312404 A1* | 10/2015 | Abramson .......... H04W 4/027 455/418 |
| 2016/0077592 A1* | 3/2016 | Bhesania ............... G06F 3/011 345/650 |
| 2017/0062012 A1* | 3/2017 | Bloch ................... G11B 27/34 |
| 2019/0243144 A1 | 8/2019 | Bamberger et al. |

FOREIGN PATENT DOCUMENTS

| | | |
|---|---|---|
| EP | 2672699 | 12/2013 |
| WO | 2005125186 | 12/2005 |
| WO | 2014020318 | 2/2014 |
| WO | 2018157062 | 8/2018 |
| WO | WO-2018157062 A1 | 8/2018 |

OTHER PUBLICATIONS

"International Application Serial No. PCT US2018 019732, International Search Report dated Jun. 6, 2018", 6 pgs.

"International Application Serial No. PCT US2018 019732, Written Opinion dated Jun. 6, 2018", 7 pgs.

"U.S. Appl. No. 16/388,236, Non Final Office Action dated May 22, 2019", 17 pgs.

"U.S. Appl. No. 16/388,236, Response filed Sep. 13, 2019 to Non Final Office Action dated May 22, 2019", 10 pgs.

"International Application Serial No. PCT/US2018/019732, International Preliminary Report on Patentability dated Sep. 6, 2019", 9 pgs.

* cited by examiner

US 10,564,425 B2

PROCESSING A MEDIA CONTENT BASED ON DEVICE MOVEMENT

PRIORITY

This application claims the benefit of priority of U.S. Provisional Patent Application Ser. No. 62/464,183, filed on Feb. 27, 2017, which is hereby incorporated by reference herein in its entirety

BACKGROUND

Sharing media content such as audio, images, and video between user devices (e.g., mobile devices, personal computers, etc.) may entail converting the media content to a format that can be consumed by the receiving device and displaying the media content on a mobile device such as a smart phone.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to processing media content items to be shared between devices via a messaging system and to be displayed on devices. For example, a user may record a video on using a camera device. The camera device may be capable of capturing video in a circular video format. In one example, the camera device may be a pair of smart glasses that can capture an entire 115 degree field of view. The 115 degree field of view is similar to the perspective as seen with the human eye and gives the camera device the ability to capture circular video. The user may wish to share the circular video with one or more other users and/or to view the video on a display of a computing device, such as a smart phone. Example embodiments allow a user to view a video that is in a circular video format in a display of a computing device, rotate the display of the video to take advantage of the circular wide angle view of the video, and view the video in fullscreen mode and circular view.

Figure 1:
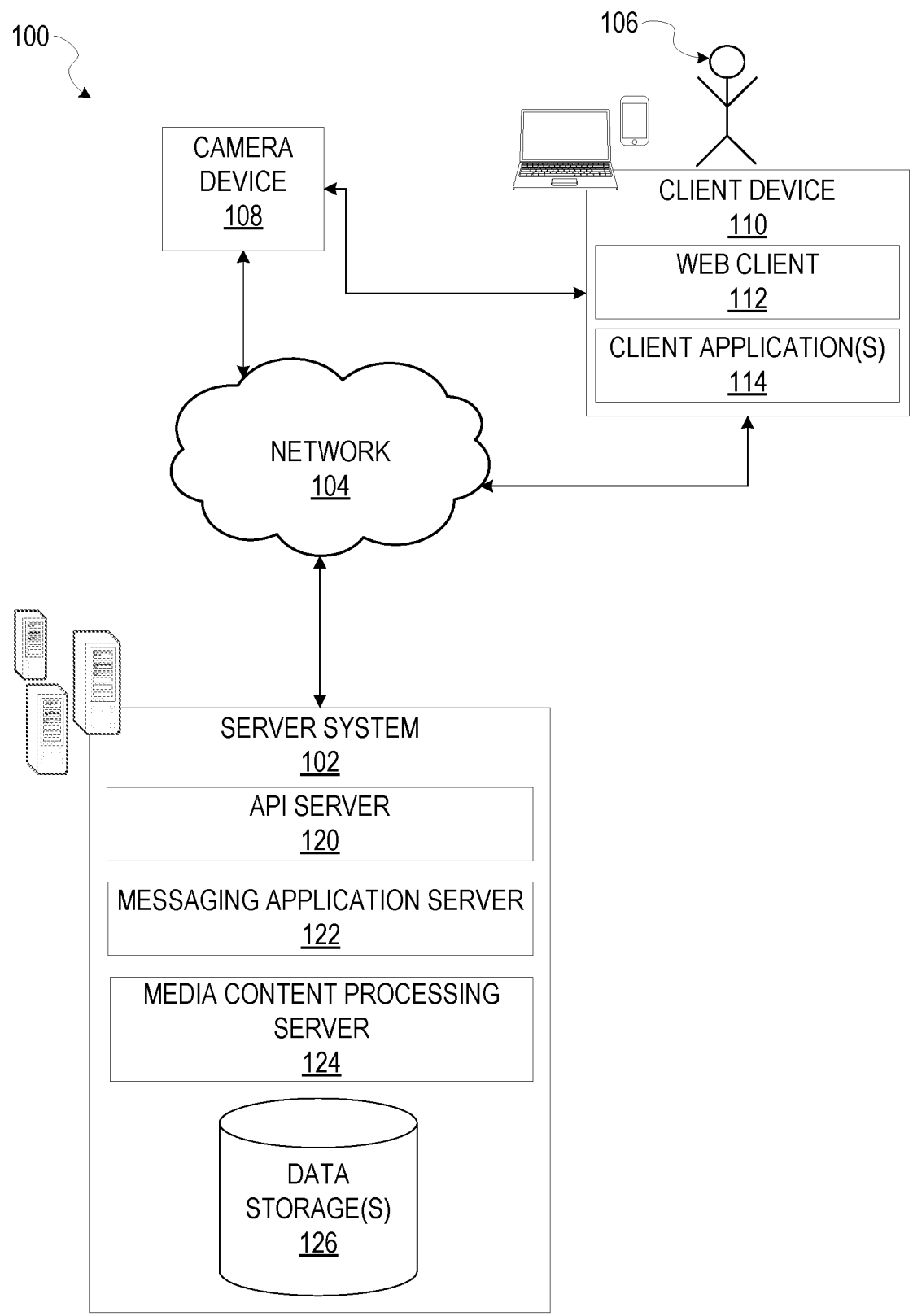
FIG. 1 is a block diagram illustrating a networked system, according to some example embodiments.

FIG. 1 is a block diagram illustrating a networked system 100, according to some example embodiments, configured to process media content items and send and receive messages which include the processed media content. In one example embodiment, the system is a messaging system configured to receive a plurality of messages from a plurality of users, process media content contained in the messages, and send messages to one or more users with the processed media content. The system 100 may include one or more client devices such as client device 110. The client device 110 may also be referred to herein as a user device or a computing device. The client device 110 may comprise, but is not limited to, a mobile phone, desktop computer, laptop, portable digital assistant (PDA), smart phone, tablet, ultra book, netbook, laptop, multi-processor system, microprocessor-based or programmable consumer electronic, game console, set-top box, computer in a vehicle, or any other communication device that a user may utilize to access the networked system 100.

In some embodiments, the client device 110 may comprise a display module (not shown) to display information (e.g., in the form of user interfaces). In some embodiment the display module or user interface(s) is used to display media content such as video (e.g., conventional video and video in circular video format), images (e.g., photographs), and the like. In further embodiments, the client device 110 may comprise one or more of touch screens, accelerometers, gyroscopes, cameras, microphones, global positioning system (GPS) devices, and so forth. The client device 110 may be a device of a user that is used to create content media items such as video, images (e.g., photographs), audio, and send and receive messages containing such media content items to and from other users.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, an e-commerce site application, a mapping or location application, media content editing application, a media content viewing application, and the like.

In one example, a client application 114 may be a messaging application that allows a user 106 to take a photograph or video (or receive media content from camera device 108), add a caption, or otherwise edit the photograph or video, and then send the photograph or video to another user. The client application 114 may further allow the user 106 to view photographs or video that the user 106 has taken via the client device, via a camera device 108, or to view photographs and video (e.g., in conventional video format or circular video format) that another user 106 has taken via a client device 110 or camera device 108. The message may be ephemeral and be removed from a receiving user device after viewing or after a predetermined amount of time (e.g., 10 seconds, 24 hours, etc.). The messaging application may further allow a user 106 to create a gallery. A gallery may be a collection of media content such as photos and videos which may be viewed by other users "following" the user's gallery (e.g., subscribed to view and receive updates in the user's gallery). The gallery may also be ephemeral (e.g., lasting 24 hours, lasting a duration of an event (e.g., during a music concert, sporting event, etc.), or other predetermined time).

An ephemeral message may be associated with a message duration parameter, the value of which determines an amount of time that the ephemeral message will be displayed to a receiving user of the ephemeral message by the client application 110. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user 106 to store photographs and videos and create a gallery that is not ephemeral and that can be sent to other users. For example, to assemble photographs and videos from a recent vacation to share with friends and family.

In some embodiments, one or more applications 114 may be included in a given one of the client device 110, and configured to locally provide the user interface and at least some of the functionalities with the application 114 configured to communicate with other entities in the system 100 (e.g., server system 102), on an as needed basis, for data and/or processing capabilities not locally available (e.g., access location information, to authenticate a user 106, to verify a method of payment, access media content stored on a server, sync media content between the client device 110 and a server computer, etc.). Conversely, one or more applications 114 may not be included in the client device 110, and then the client device 110 may use its web browser to access the one or more applications hosted on other entities in the system 100 (e.g., server system 102).

Media content such as images and video may be captured via the client device (e.g., via a camera of the client device) and/or via a separate camera device 108. The camera device 108 may be a standalone camera, may be a wearable device, such as an electronic-enabled watch, key fob, eyewear device, and the like. In one example, the camera device 108 is an electronic enabled eyewear device, such as so-called smart glasses (e.g., SNAP SPECTACLES). An example electronic enabled eyewear is shown in FIG. 3.

Figure 3:
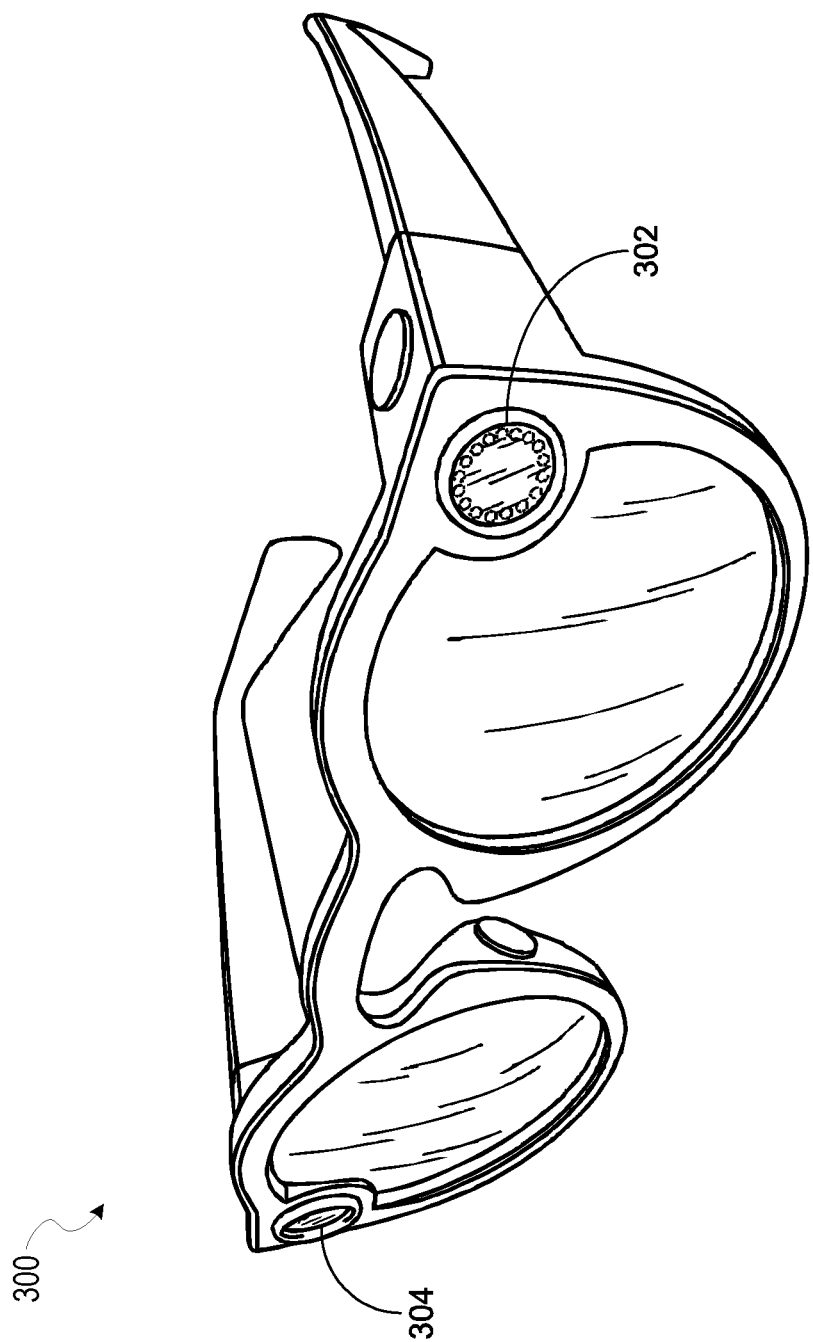
FIG. 3 illustrates an example pair of smart glasses, according to some example embodiments.

FIG. 3 shows a pair of smart glasses 300 according to one example embodiment. The smart glasses 300 have one or more integrated cameras (e.g., at opposite ends of a glassware frame in one example, shown as 302 and 304), with respective lens(es) of the camera(s) facing forwards and having a transparent covering.

In one example, the smart glasses 300 or other camera device 108 may capture video in a circular video format. For example, the camera device 108 may comprise a circular wide angle lens that captures an entire 115 degree field of view (e.g., a camera sensor of the camera device 108 captures the entire 115 degree field of view). The 115 degree field of view is similar to the perspective as seen with the human eye and gives the camera device 108 the ability to capture circular video.

In one example for capturing video in a circular video format, the camera device 108 may comprise a sensor (e.g., a square or rectangular sensor) for capturing images and video. The camera device 108 may further comprise an enclosure in front of the sensor to block out portions of the sensor outside of a circular region (e.g., so light will only hit the circular region). The camera lens may be set behind the enclosure. Accordingly, the camera device 108 may only capture circular video in the circular region. Optionally, the camera device 108 may further crop each circular formatted video (e.g., frame by frame to set surrounding pixel values to zero that are outside of a predetermined circular size) to account for any noise around the edges of the circular region. In this way the camera device 108 may optimize the circular format during capture of the video. For example, since the video format can contain the circular video, the circular video can be exported without any additional modification. Also, there may be some benefits of video compression achieved by cropping the circular content in firmware.

Returning to FIG. 1, a server system 102 may provide server-side functionality via the network 104 (e.g., the Internet or wide area network (WAN)) to one or more client devices 110. The server system 102 may include an application programming interface (API) server 120, a messaging application server 122, and a media content processing server 124, which may each be communicatively coupled with each other and with one or more data storage(s) 126.

The server system 102 may be a cloud computing environment, according to some example embodiments. The server system 102, and any servers associated with the server system 102, may be associated with a cloud-based application, in one example embodiment. The one or more data storages 126 may be storage devices that store information such as untreated media content, original media content from users 106 (e.g., high quality media content), processed media content (e.g., media content that is formatted for sharing with client devices 110 and viewing on client devices 110), user information, user device information, and so forth. The one or more data storages 126 may include cloud-based storage external to the server system 102 (e.g., hosted by one or more third party entities external to the server system 102). The data storages 126 may include databases, blob storages, and so forth.

The media content processing server 124 may provide functionality to perform various processing of media content items. The media content processing server 124 may access one or more data storages 126 to retrieve stored data to use in processing media content and to store results of processed media content.

The messaging application server 122 may be responsible for generation and delivery of messages between users 106 of client devices 110. The messaging application server 122 may utilize any one of a number of message delivery networks and platforms to deliver messages to users 106. For example, the messaging application server 122 may deliver messages using electronic mail (e-mail), instant message (IM), Short Message Service (SMS), text, facsimile, or voice (e.g., Voice over IP (VoIP)) messages via wired (e.g., the Internet), plain old telephone service (POTS), or wireless networks (e.g., mobile, cellular, WiFi, Long Term Evolution (LTE), Bluetooth).

As explained above, a user 106 may wish to share various media content items (e.g., videos, audio content, images, etc.) with one or more other users. For example, the user 106 may use the client device 110 or other device (e.g., camera device 108) to take various videos and photographs on his vacation. The user 106 may want to share the best videos and photographs from his vacation with his friends and family. The user 106 may utilize a client application 114 on the client device 110, such as a messaging application, to select the media content items that he would like to share. The user 106 may also edit the various media content items using the client application 114. For example, the user 106 may add text to the media content item, choose an overlay for the media content item (labels, drawings, other artwork, etc.), may draw on the media content item, crop or alter (e.g., red-eye reduction, focus, color adjustment, etc.) the media content item, and so forth. A media content item that is "untreated" refers to a media content item that has not been edited using the client application 114.

The user 106 may select the media content items that he would like to share with his friends and family via the client application 114. Once he has selected the media content items, he may indicate that he would like to share the media content items. For example, he may choose an option on a user interface of the client application 114 (e.g., menu item, button, etc.) to indicate that he wishes to share the media content items.

The user 106 may view media content via the client application 114. For example, the user 106 may view media content he has captured on the client device 110 (e.g., via a camera of the client device 110), the user 106 may view media content captured by others and sent to the user 106, and the user 106 may view media content captured by camera device 108.

Figure 2:
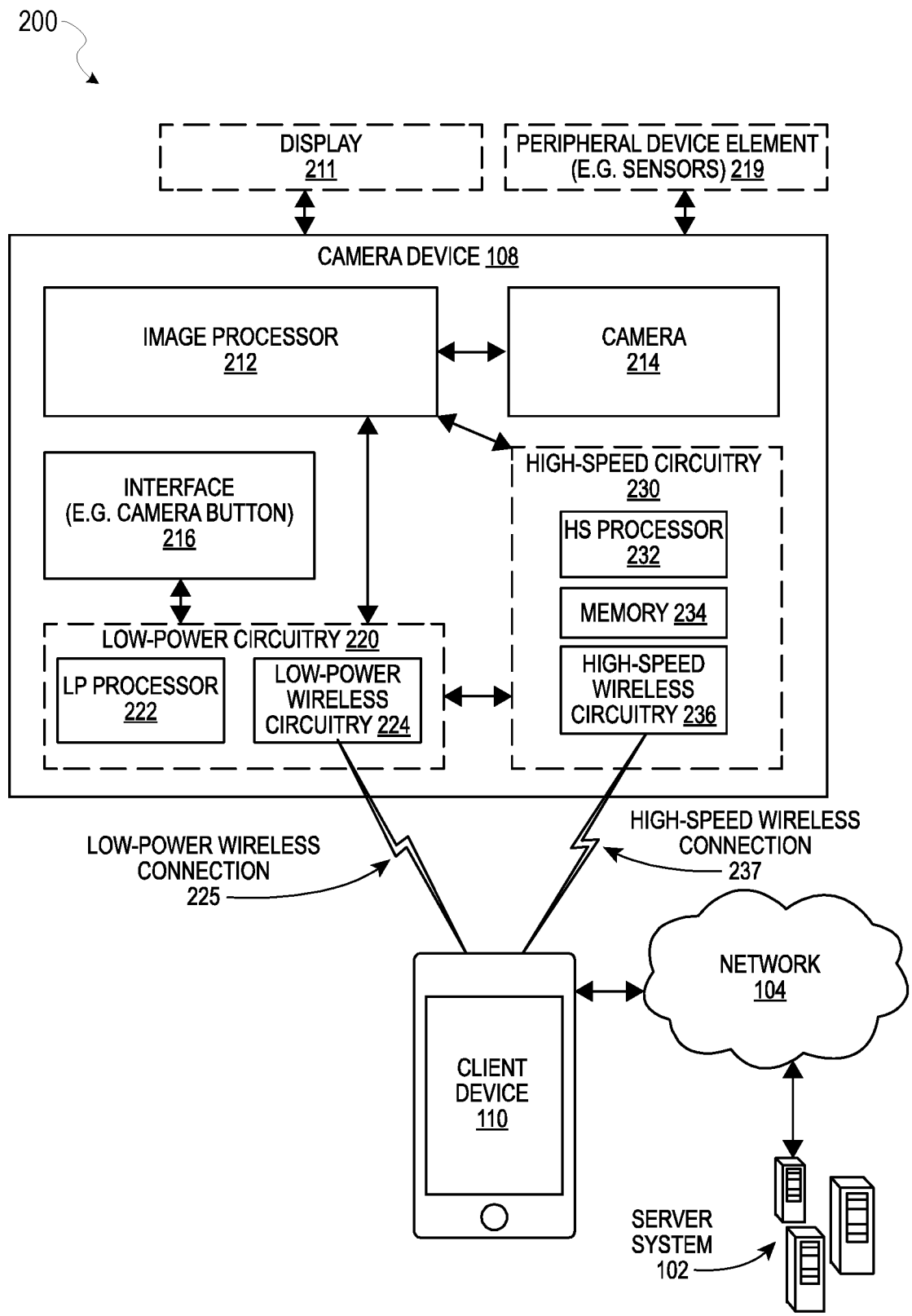
FIG. 2 is a block diagram illustrating a networked system including details of a camera device, according to some example embodiments.

FIG. 2 is a block diagram illustrating a networked system 200 including details of a camera device 108, according to some example embodiments. In certain embodiments, camera device 108 may be implemented in smart glasses 300 of FIG. 3 described above.

System 200 includes camera device 108, client device 110, and server system 102, as described above with respect to FIG. 1. Client device 110 may be a smartphone, tablet, phablet, laptop computer, access point, or any other such device capable of connecting with camera device 108 using both a low-power wireless connection 225 and a high-speed wireless connection 237. Client device 110 is connected to server system 102 and network 104. The network 104 may include any combination of wired and wireless connections, as explained above. Server system 102 may be one or more computing devices as part of a service or network computing system, as also explained above. Client device 110 and any elements of server system 102 and network 104 may be implemented using details of software architecture 1202 or machine 1300 described in FIGS. 12 and 13.

System 200 may optionally include additional peripheral device elements 219 and/or a display 211 integrated with camera device 210. Such peripheral device elements 219 may include biometric sensors, additional sensors, or display elements integrated with camera device 210. Examples of peripheral device elements 219 are discussed further with respect to FIGS. 12 and 13. For example, peripheral device elements 219 may include any I/O components 1350 including output components 1352, motion components 1358, or any other such elements described herein.

Camera device 108 includes camera 214, video processor 212, interface 216, low-power circuitry 220, and high-speed circuitry 230. Camera 214 includes digital camera elements such as a charge coupled device, a lens, or any other light capturing elements that may be used to capture data as part of camera 214.

Interface 216 refers to any source of a user command that is provided to camera device 210. In one implementation, interface 216 is a physical button on a camera that, when depressed, sends a user input signal from interface 216 to low power processor 222. A depression of such a camera button followed by an immediate release may be processed by low power processor 222 as a request to capture a single image. A depression of such a camera button for a first period of time may be processed by low-power processor 222 as a request to capture video data while the button is depressed, and to cease video capture when the button is released, with the video captured while the button was depressed stored as a single video file. In certain embodiments, the low-power processor 222 may have a threshold time period between the press of a button and a release, such as 500 milliseconds or one second, below which the button press and release is processed as an image request, and above which the button press and release is interpreted as a video request. The low power processor 222 may make this determination while the video processor 212 is booting. In other embodiments, the interface 216 may be any mechanical switch or physical interface capable of accepting user inputs associated with a request for data from the camera 214. In other embodiments, the interface 216 may have a software component, or may be associated with a command received wirelessly from another source.

Video processor 212 includes circuitry to receive signals from the camera 214 and process those signals from the camera 214 into a format suitable for storage in the memory 234. Video processor 212 is structured within camera device 210 such that it may be powered on and booted under the control of low-power circuitry 220. Video processor 212 may additionally be powered down by low-power circuitry 220. Depending on various power design elements associated with video processor 212, video processor 212 may still consume a small amount of power even when it is in an off state. This power will, however, be negligible compared to the power used by video processor 212 when it is in an on state, and will also have a negligible impact on battery life. Device elements in an "off" state are still configured within a device such that low-power processor 222 is able to power on and power down the devices. A device that is referred to as "off" or "powered down" during operation of camera device 108 does not necessarily consume zero power due to leakage or other aspects of a system design.

In one example embodiment, video processor 212 comprises a microprocessor integrated circuit (IC) customized for processing sensor data from camera 214, along with volatile memory used by the microprocessor to operate. In order to reduce the amount of time that video processor 212 takes when powering on to processing data, a non-volatile read only memory (ROM) may be integrated on the IC with instructions for operating or booting the video processor 212. This ROM may be minimized to match a minimum size needed to provide basic functionality for gathering sensor data from camera 214, such that no extra functionality that would cause delays in boot time are present. The ROM may be configured with direct memory access (DMA) to the volatile memory of the microprocessor of video processor 212. DMA allows memory-to-memory transfer of data from the ROM to system memory of the video processor 212 independently of operation of a main controller of video processor 212. Providing DMA to this boot ROM further reduces the amount of time from power on of the video processor 212 until sensor data from the camera 214 can be processed and stored. In certain embodiments, minimal processing of the camera signal from the camera 214 is performed by the video processor 212, and additional processing may be performed by applications operating on the client device 110 or server system 102.

Low-power circuitry 220 includes low-power processor 222 and low-power wireless circuitry 224. These elements of low-power circuitry 220 may be implemented as separate elements or may be implemented on a single IC as part of a system on a single chip. Low-power processor 222 includes logic for managing the other elements of the camera device 108. As described above, for example, low power processor 222 may accept user input signals from an interface 216. Low-power processor 222 may also be configured to receive input signals or instruction communications from client device 110 via low-power wireless connection 225. Additional details related to such instructions are described further below. Low-power wireless circuitry 224 includes circuit elements for implementing a low-power wireless communication system. Bluetooth™ Smart, also known as Bluetooth™ low energy, is one standard implementation of a low power wireless communication system that may be used to implement low-power wireless circuitry 224. In other embodiments, other low power communication systems may be used.

High-speed circuitry 230 includes high-speed processor 232, memory 234, and high-speed wireless circuitry 236. High-speed processor 232 may be any processor capable of managing high-speed communications and operation of any general computing system needed for camera device 210. High speed processor 232 includes processing resources needed for managing high-speed data transfers on high-speed wireless connection 237 using high-speed wireless circuitry 236. In certain embodiments, the high-speed processor 232 executes an operating system such as a LINUX operating system or other such operating system such as operating system 1204 of FIG. 12. In addition to any other responsibilities, the high-speed processor 232 executing a software architecture for the camera device 108 is used to manage data transfers with high-speed wireless circuitry 236. In certain embodiments, high-speed wireless circuitry 236 is configured to implement Institute of Electrical and Electronic Engineers (IEEE) 802.11 communication standards, also referred to herein as Wi-Fi. In other embodiments, other high-speed communications standards may be implemented by high-speed wireless circuitry 236.

Memory 234 includes any storage device capable of storing camera data generated by the camera 214 and video processor 212. While memory 234 is shown as integrated with high-speed circuitry 230, in other embodiments, memory 234 may be an independent standalone element of the camera device 108. In certain such embodiments, electrical routing lines may provide a connection through a chip that includes the high-speed processor 232 from the video processor 212 or low-power processor 222 to the memory 234. In other embodiments, the high-speed processor 232 may manage addressing of memory 234 such that the low-power processor 222 will boot the high-speed processor 232 any time that a read or write operation involving memory 234 is needed.

Figure 4:
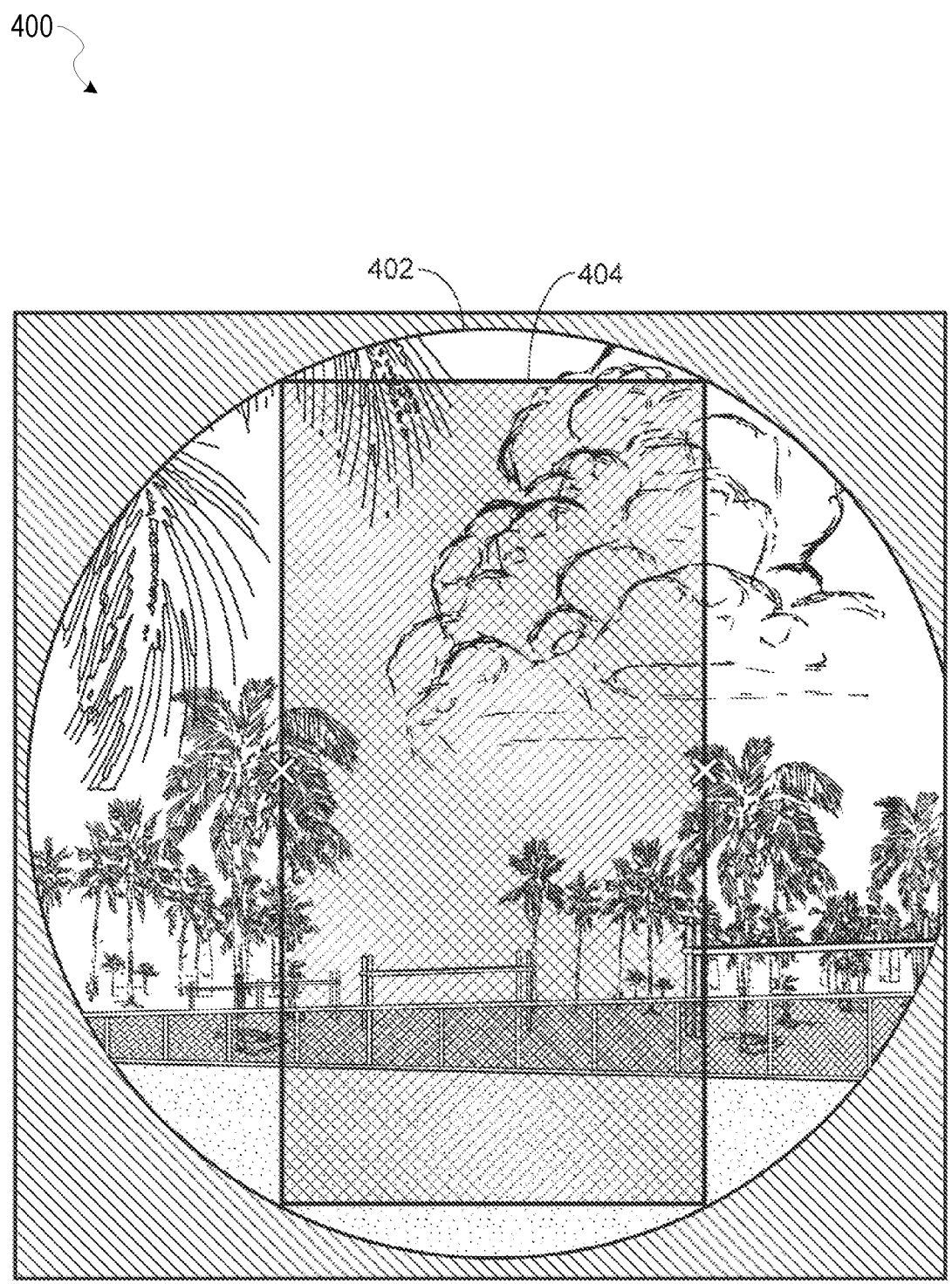
FIG. 4 shows an example display of a circular video format, according to some example embodiments.

As explained above, media content (e.g., video content) may be captured in a circular video format. FIG. 4 shows an example display 400 of a circular video format on a client device 110. As may be seen in this example, the circular video format 402 of the media content (e.g., video) is larger than a display 404 (e.g., screen) of the client device 110. Accordingly, when in fullscreen mode as shown in the display 404, only a portion of the entire video is displayed. Example embodiments allow a user to rotate the client device 110 to cause the media content in the display 404 of the client device 110 to rotate to take advantage of the circular video format 402 and to view or expose more areas of the circular video format.

Figure 5:
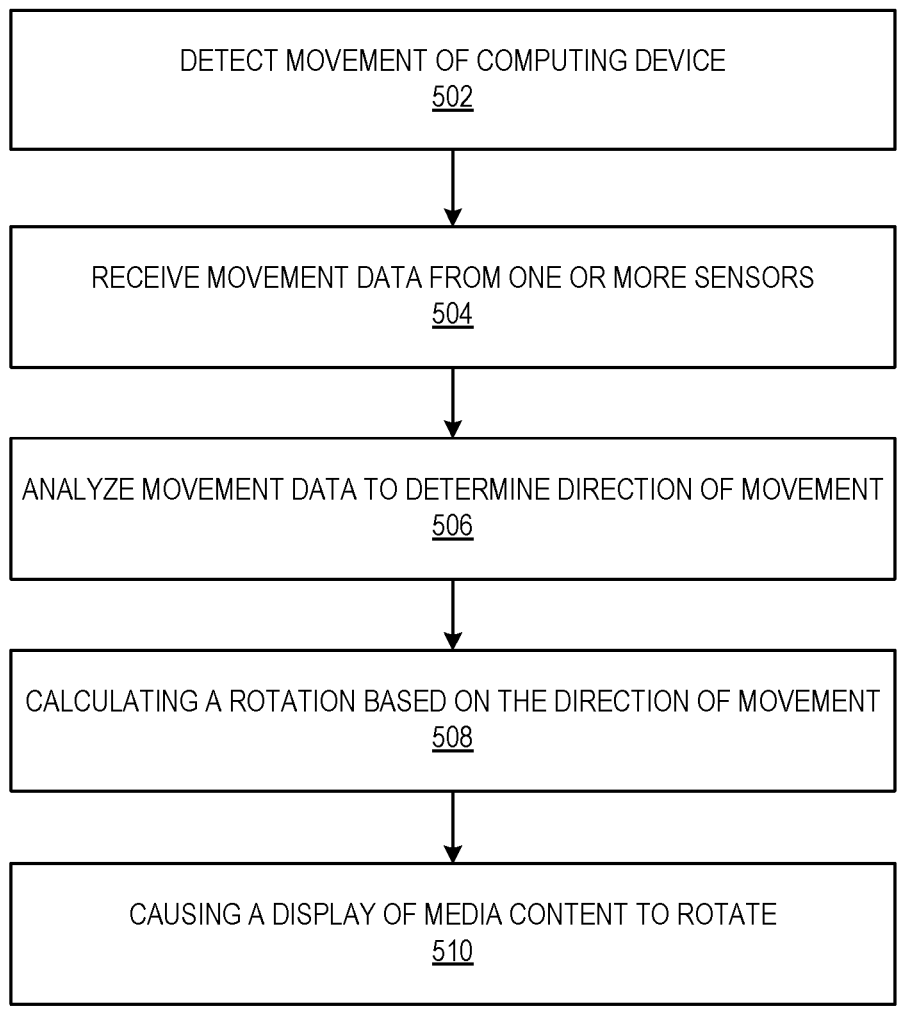
FIG. 5 is a flowchart illustrating aspects of a method, according to some example embodiments.

FIG. 5 is a flow chart illustrating aspects of a method 500, according to some example embodiments, for playback behavior and interactions when media content (e.g., video content) in circular video format is displayed on a client device 110. For illustrative purposes, method 500 is described with respect to the networked system 100 of FIG. 1. It is to be understood that method 500 may be practiced with other system configurations in other embodiments.

In operation 502, a computing device (e.g., client device 110) detects movement of the computing device during playback of media content (or media content stream) on a display of the computing device. For example, a user 106 may be watching a video that was captured in circular video format. The user 106 may tilt or rotate the device to view other areas of the circular video format. The computing device (e.g., via a rotational player) may detect movement of the computing device via one or more sensors of the computing device. For example, the computing device may comprise an accelerometer sensor, a gyroscope sensor, and/or other motion sensor(s). An accelerometer sensor measures acceleration (e.g., a rate of change in velocity) of a computing device. The accelerometer sensor is also used to determine a computing device's orientation along its three axes. For example, movement data from the accelerometer can be used to tell if a computing device is in portrait or landscape mode, among other things. A gyroscope sensor can also provide orientation information and measures any changes in orientation.

In operation 504, the computing device receives movement data from the one or more sensors of the computing device. In one example, the movement data is received from an accelerometer sensor and the movement data comprises the computing device's orientation including rotation of the computing device's axes relative to the downward force of gravity. For example, the computing device's orientation may comprise the computing device's rotation around its z-axis directed away from the display of the computing device. Movement data may also/alternatively be received from the gyroscope sensor, a gravity sensor, or other motion sensor or tool.

In operation 506, the computing device analyzes the movement data to determine a direction of movement. For example, a user may tilt the computing device to the right and the rotational player of the computing device may detect that the user is tilting the computing device to the right and how much it is rotating to the right. The rotational player will then rotate the media content (e.g., video) that was displaying in the opposite direction so that it appears like more of the media content is revealed as the computing device is tilted or rotated. In one example, the computing device may analyze the movement data, such as that the computing device has rotated nine degrees in the "Z" axis from the gyroscope, and the speed the user is rotating the phone from the accelerometer. The computing device analyzes these outputs from the sensors to determine how much the computing device is actually rotating.

In operation 508, the computing device calculates a rotation of the display of the media content based on the direction of the movement. For example, the computing device may determine that the phone has rotated 20 degrees in the "Z" axis which means that the user has rotated the computing device 20 degrees relative to the user and so the media content should be moved 20 degrees in the opposite direction.

In one example, the movement data is received from an accelerometer sensor and a gyroscope sensor. The computing device may determine that the computing device is held by the user in a flat orientation, and thus, the orientation is ambiguous. In this example, the computing device calculates the rotation of the display of the media content based on the movement data from the gyroscope sensor.

In another example, the computing device determines that the computing device is held nearly flat orientation by the user, and thus, the rotation is calculated using a combination of measurements from the accelerometer and the gyroscope is used to calculate the rotation (e.g., using movement data from both the accelerometer sensor and the gyroscope sensor).

In another example, the computing device determines that the computing device is held nearly flat orientation by the user, but only has movement data from a gyroscope sensor (e.g., the computing device may not have an accelerometer sensor). In this example, the rotation of the display of media content is calculated based on the movement data from the gyroscope sensor.

In operation 510, the computing device causes the display of the media content to rotate relative to the direction of movement, to display a portion of the media content associated with the direction of movement. In one example, displaying the portion of the media content comprises displaying a portion of the media content that was not previously viewable on the display of the computing device. In this way the user 106 may rotate the computing device to take advantage of the circular video format 402 and to view or expose more areas of the circular video format.

In one example, the media content rotates within the display on the computing device relative to the ground. In other words, the anchor point may not be set based on the user starting angular position. For example, if the computing device is held in an upwards position, the weight would be at the bottom on the computing device. If the user turns the computing device upside down the media content would flip so that the weight would again be at the "bottom" of the device (which upside down is actually the top of the device).

In another example, if the computing device is nearly horizontal, the media content rotation does not track gravity 1:1, but instead tracks the computing device's gyroscope data. This may be done to avoid small computing device orientation changes mapping to large rotational changes.

In another example, any media overlays (e.g., text, stickers, special effects, geo-filter, etc.) or other creative tools may rotate with the media content rotation. For example, if a user puts a sticker at the bottom right of a video while the user is holding the computing device up, when the user rotates the computing device 90 degrees, the user will not be able to see the sticker anymore because it will have gone off screen/display. In this way the media overlay stays in the actual location where it was placed, even when the media content is rotated.

In another example, if a drastic change in rotation is detected (e.g., such as when a user flips the computing device over), the computing device should update the rotation and animate the transition to cause it to appear as a smooth transition (e.g., to smoothly follow the computing device's rotation). For large changes in rotation, the motion may be briefly delayed as it eases toward the device's rotation. In one example, a drastic change in rotation may be considered any rotation greater than ten or twenty degrees.

Some actions by the user may pause rotation functionality. For example, adding creative content (e.g., a media overlay) may automatically pause rotation. Once the creative content has been added or placed on the media content, the rotation may automatically be enabled again.

In one example, if the computing device does not have a way to measure its rotation, the rotation functionality is disabled and the display of the media content is shown in fullscreen mode.

Some example embodiments may include a parallax effect. For example, if a user tilts the computing device slightly, a small portion of the video in the direction that the user tilted is revealed. In this way, the movement of the media content is moved (e.g., slides) in an up and down and left to right motion, as a user is swiveling the computing device back and forth. This is intended to make it feel more like the user is looking around. In one example, no matter how far the user tilt's the computing device, the user will never see the edge of the video. When the user begins viewing the media content that was captured in circular video format, the very center of the media content is displayed unless the user was previously watching another media content in circular video format, in which case the location of the video on the screen/display is inherited from the previous video.

Figure 6:
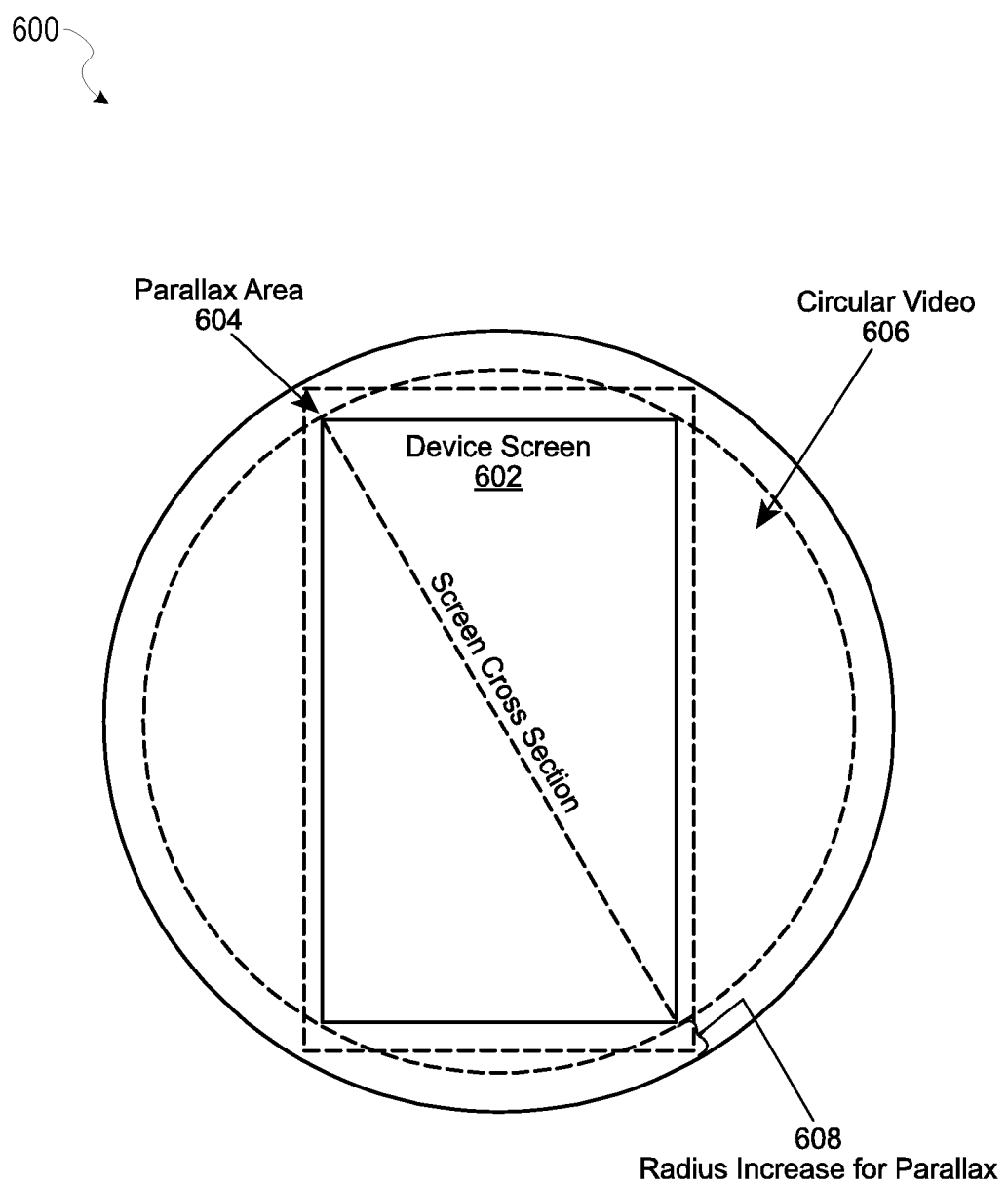
FIG. 6 illustrates an example parallax area diagram, according to some example embodiments.

FIG. 6 shows an example parallax area diagram 600. The diagram 600 in FIG. 6 is not shown to scale. This diagram 600 shows an area of display on a computing device screen 602 that is slightly smaller than a parallax area 604 (e.g., a fullscreen area). In one example, 86% of the media content (e.g., video) is visible without parallax. The media content may be in a circular video format 606.

The parallax area 604 is the region that the computing device screen can flow around. For example, the parallax area 604 is the area in which the screen can move relative to the video without exposing any edges of the video. Thus, as a user tilts the computing device, the area of display on the screen 602 can move around (e.g., slide) to the different edges of the parallax area 604. In this way it appears to the user that he is peeking into more of the video. This may make the movement feel a bit more natural and more three dimensional. For example, if a user rotates the computing device to the right, he will see some of the video on the left that he would not normally see. Without the parallax effect, the video would take up the fullscreen area (e.g., the parallax area 604).

In one example, the size of the media content circle is determined by the cross section of the computing device's screen (e.g., the media content size is relative to the computing device screen size). In another example, the diameter of the video circle is 7% larger than the cross section distance of the computing device's screen (e.g., radius 3.5%), as shown as the radius increase for parallax 608. This value is intended to give a subtle experience.

In one example, rotation on the device for the parallax effect is reported in radians per second. For example, the media content in the computing device screen 602 may move at a rate of 1 radian=2 pts on screen (2× multiplier).

In another example, the translation of the media content follows a quadratic curve when moving out from the center and a linear curve when moving in towards the center. This gives the motion a smoother feeling. For example, moving away from the center will start out slowly and go faster, and moving in towards the center will move in at the same speed the whole time.

In another example, the rotation in the parallax effect is not based on some group truth or gravity, the screen translation reacts to any change in rotation. For example, if a user tilts the device ninety degrees to the right, then slightly back to the left, the screen will not be on the right edge of the parallax area 604.

In another example, if a drastic change in translation due to parallax is necessary, such as when a user quickly tilts the computing device, the computing device should update translation as explained above regarding a drastic change in rotation. In one example, a drastic change in translation is any change which is greater than 1/3 of the translation range in at least one axis. If this occurs at the same time as a drastic change in motion, rotation animation may be used.

Figure 7:
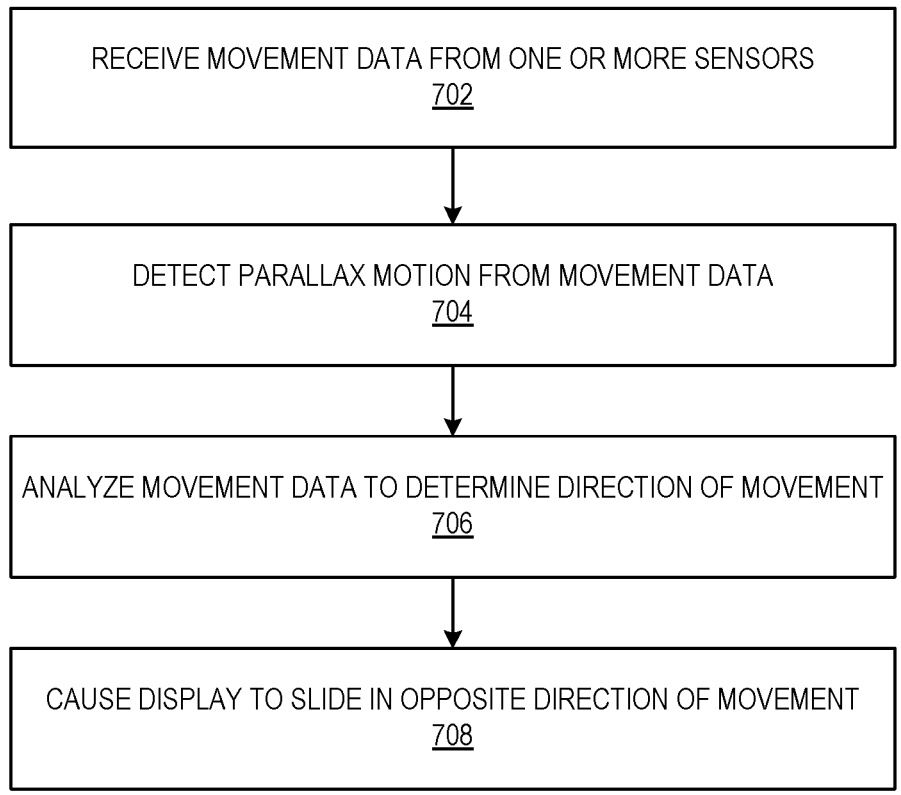
FIG. 7 is a flowchart illustrating aspects of a method, according to some example embodiments.

FIG. 7 is a flow chart illustrating aspects of a method 700, according to some example embodiments, for detecting parallax motion and causing a display to slide accordingly. For illustrative purposes, method 700 is described with respect to the networked system 100 of FIG. 1. It is to be understood that method 700 may be practiced with other system configurations in other embodiments.

In operation 702, a computing device (e.g., client device 110) receives movement data from one or more sensors. In one example, parallax motion is detected by monitoring a gyroscope sensor, which measures the rotation rate of the computing device about its axes. For instance, rotation about the y-axis controls the horizontal (side-to-side) parallax motion, and rotation about the x-axis controls the vertical (up-and-down parallax motion). In one example, the parallax motion decelerates as it eases out to the margins of the circular video format, and moves at a constant rate when it re-centers.

In operation 704, the computing device detects parallax motion from the movement data, and in operation 706, the computing device analyzes the movement data to determine a direction of movement of the computing device. In operation 708, the computing device causes the display of the media content to slide in opposite direction of the direction of movement.

Figure 8:
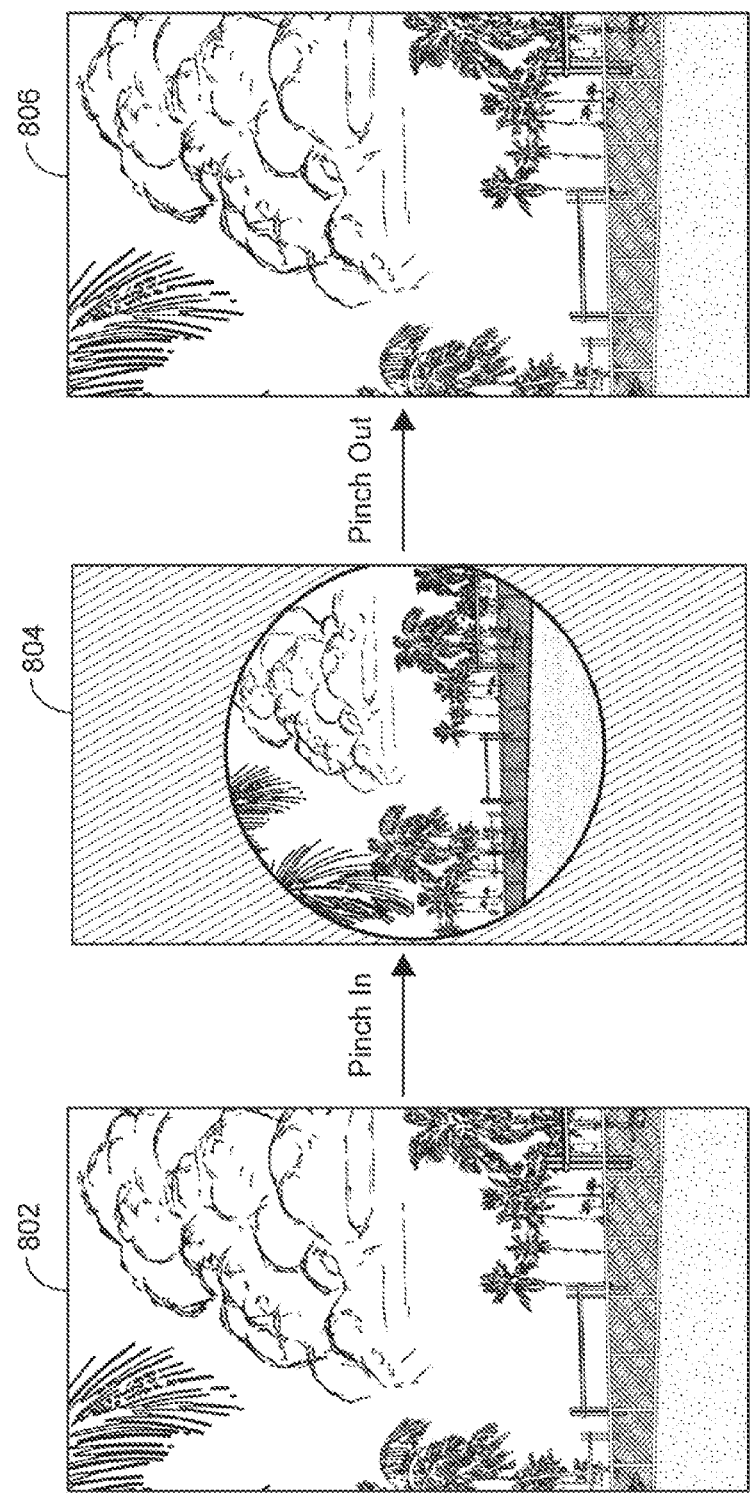
FIG. 8 illustrates example displays on a computing device, according to some example embodiments.

Some example embodiments allow a user to use a gesture as an input on the computing device such as a "pinch" on a display on a computing device (e.g., client device 110) while viewing media content in a circular video format to change between viewing the media content in fullscreen mode and viewing the media content as a circle. FIG. 8 illustrates example displays 802, 804, and 806 of media content based on a user pinching in or pinching out on the display. For example, a user may be viewing media content (e.g., video) on a display of a computing device in fullscreen mode as shown in the example display 802. The display of the computing device may be a touch screen display and the user may use his fingers to pinch in on the display. When the user pinches in and lets go on the fullscreen mode of 802, the display of the computing device will change to a circle display mode as shown in the example display 804. When the user pinches out and lets go on the circle display mode as shown in 804, the display of the computing price will change as shown in the example display 806 display in fullscreen mode. In one example a user can pinch and hold and the media content will continue to be displayed at the size the user is holding. For example, a user may pinch and hold a video display at a smaller circle size and the video would continue playing that size until the user lets go of the pinch.

In one example, media content in a circular video format may be displayed in fullscreen mode by default. When a user pinches inward on any fullscreen mode display of media content in circular video format, the media content shrinks into a small circle, referred to herein as pinched mode. When a user pinches outward on any pinched mode media content, the media content expands into fullscreen mode. Media content may remain in pinched mode until a media content that is not in a circular video format is displayed or the user finishes the fullscreen viewing session. In one example, when the media content is in pinched mode the entire view of the circular video format is displayed. In another example, when the media content is in fullscreen mode, only a center portion of the circular video format is displayed.

In one example, the parallax effect is ignored linearly as the user pinches down to the pinched mode size. For example if the use is pinching such that the circle size is 80% of the way to the pinched mode default size, the parallax effect would have 20% its normal impact on video translation. In one example the parallax effect may be capped to 100% and 0% such that a user cannot get a stronger effect by pinching out beyond the default fullscreen mode size.

Figure 9:
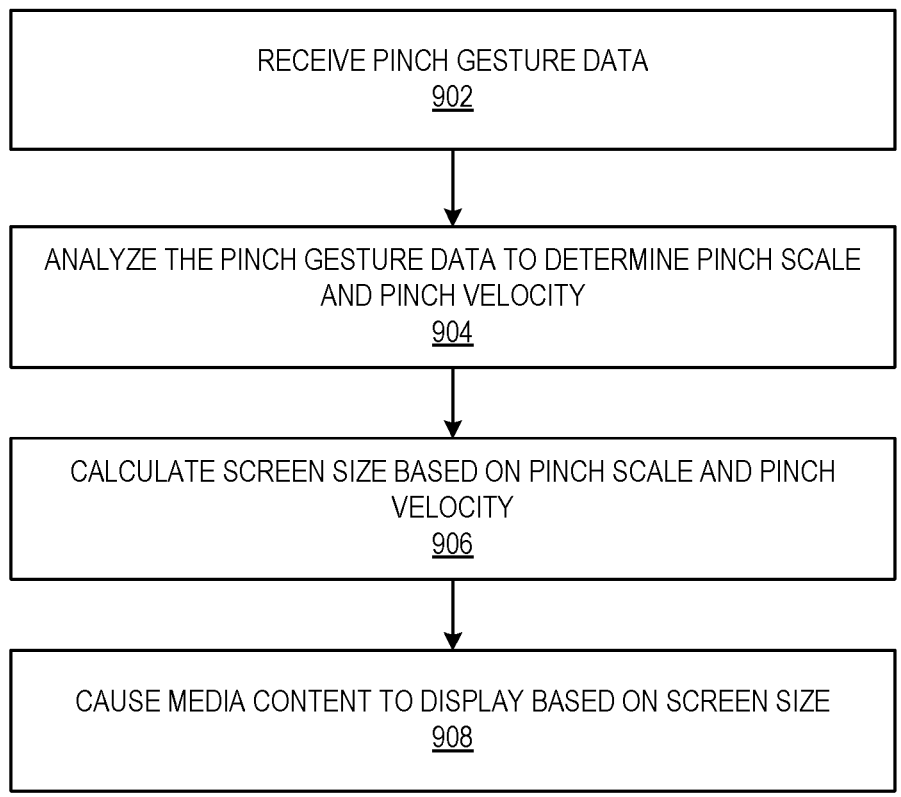
FIG. 9 is a flowchart illustrating aspects of a method, according to some example embodiments.

FIG. 9 is a flow chart illustrating aspects of a method 900, according to some example embodiments, for manipulating a view of media content via a pinch gesture. For illustrative purposes, method 900 is described with respect to the networked system 100 of FIG. 1. It is to be understood that method 900 may be practiced with other system configurations in other embodiments.

In operation 902, a computing device (e.g., client device 110) receives pinch gesture data. For example, there may be a tool included in the operating system of the computing device that can recognize a pinch gesture and send data about the pinch gesture. The computing device (e.g., via a client application 114), may request pinch gesture data and receive the pinch gesture data when available.

In operation 904, the computing device analyzes the pinch gesture data to determine pinch scale and pinch velocity. For example, the pinch gesture data may include a pinch scale (e.g., how far apart a user's fingers moved from a start positing to a hold or release position), and a pinch velocity (e.g., how quickly the user expanded, contracted, or released his fingers). In operation 906, the computing device calculates a media content (e.g., video) display size based on the pinch scale and the pinch velocity. For example, if a user was in fullscreen mode to start and starts pinching smaller on the screen, the display of the media content would transition from fullscreen mode to a circle format at the size and rate that the user is pinching. And when the user is in pinched mode and starts pinching larger on the display, the display of the media content in a smaller circle would grow to a larger circle at the size and rate the user is pinching. Once the user releases his fingers, the media content display size transitions to fullscreen mode or pinched mode depending on where the user release his fingers and how fast he releases them.

For example, if the user was in fullscreen mode before he began pinching and he releases his fingers within 60% of fullscreen mode scale size and the scale velocity is greater than a predetermined speed (e.g., >−1/s), then the display is animated (e.g., transitions) to fullscreen mode. If the user releases his finger with the scale velocity is less than a predetermined speed (e.g., <−1/s), then the display is animated to pinched mode. If the user releases his finger within 40% of the pinched mode scale size, the display is animated to pinched mode.

In another example, if the user was in pinched mode before he began pinching and he releases his finger within 40% of pinched mode scale size and the scale velocity is less than a predetermined speed (e.g., <1/s), the display is animated back to pinched mode. If the user releases his finger with the scale velocity greater than a predetermined speed (e.g., >1/s), the display is animated to fullscreen mode. If the user releases his finger within 60% of the fullscreen mode scale, the display is animated to fullscreen mode.

In one example, the display is animated between modes after the user releases his finger using a spring animation. This may include damping at 0.75, and an initial spring velocity of a velocity from the pinch gesture (which may be converted to pixels for iOS). In one example, the duration if abs(pinch velocity)>1 may be 0.3 seconds. In another example, the duration if abs(pinch velocity)<1 may be 0.4 seconds (e.g., slightly longer to allow for animation to speed up).

In operation 908, the computing device causes the media content to display based on the media content display size.

In one example, if the user pinches beyond the minimum and maximum circle sizes, the user may see a rubber banding effect. The computing device may use logarithmic curves for over pinching. In one example, a log base 15 value may be used for over pinching on pinched mode and a log base 40 may be used for over pinching on fullscreen mode.

For example:

```
// Pinching Mode
...
CGFloat naturalOverScroll = fabs([self pinchingModeScale] − pinchScale);
CGFloat adjustedOverScroll = logx(1 + naturalOverScroll, 15);
CGFloat adjustedScale = [self pinchingModeScale] − adjustedOverscroll;
...
// Fullscreen Mode
...
CGFloat naturalOverScroll = pinchScale − 1.f;
CGFloat adjustedOverScroll = logx(1 + naturalOverScroll, 40);
CGFloat adjustedScale = adjustedOverscroll + 1.f;
...
// Sample log function
float logx(float value, float base)
{
return log10f(value) / log10f(base);
}// SAMPLE CODE
// Pinching Mode
...
CGFloat naturalOverScroll = fabs([self pinchingModeScale] − pinchScale);
CGFloat adjustedOverScroll = logx(1 + naturalOverScroll, 15);
```

```
CGFloat adjustedScale = [self pinchingModeScale] − adjustedOverscroll;
...
// Fullscreen Mode
...
CGFloat naturalOverScroll = pinchScale − 1.f;
CGFloat adjustedOverScroll = logx(1 + naturalOverScroll, 40);
CGFloat adjustedScale = adjustedOverscroll + 1.f;
...
// Sample log function
float logx(float value, float base)
{
return log10f(value) / log10f(base);
}
```

Figure 10:
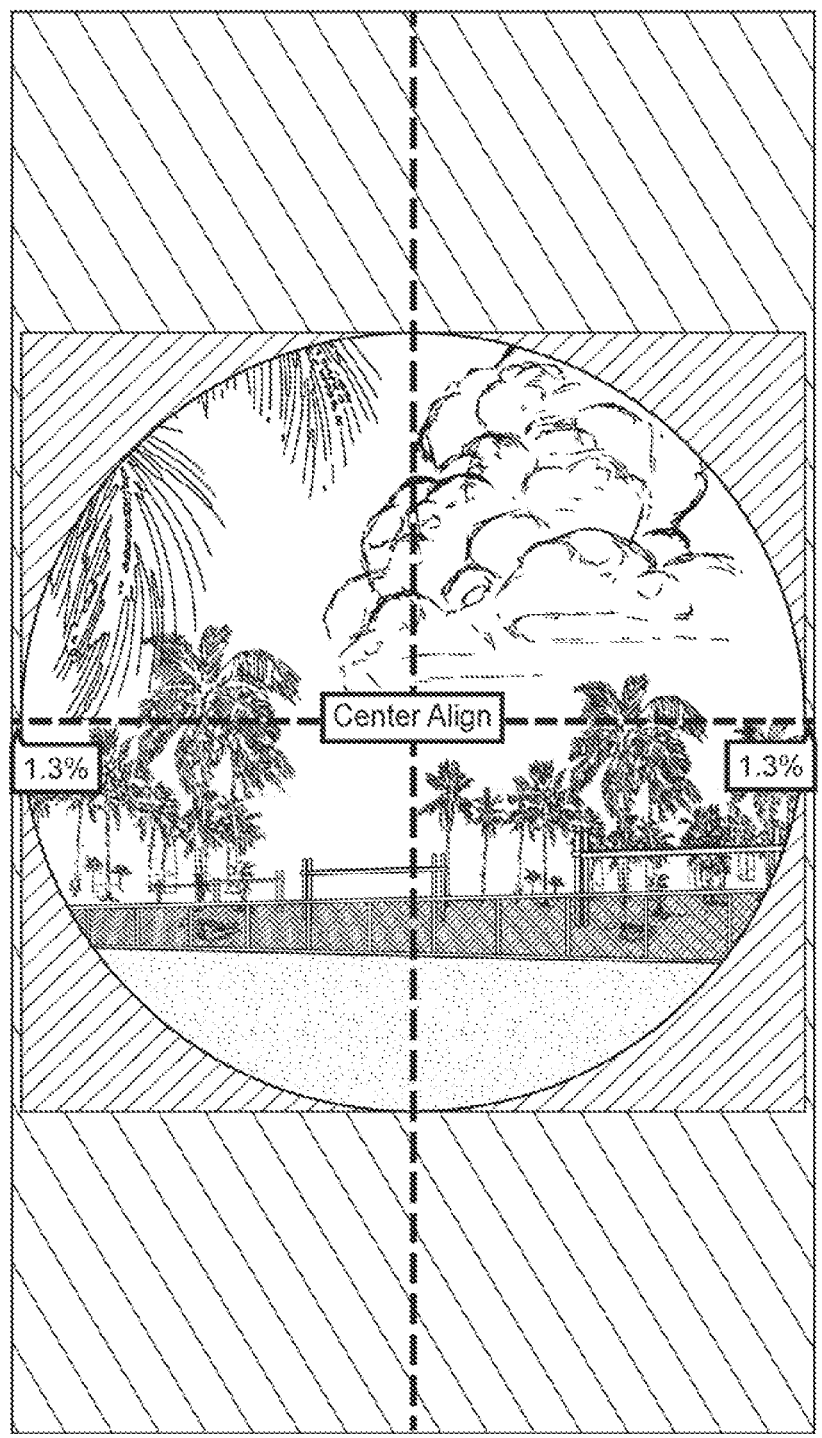
FIG. 10 illustrates an example of a redlined display, according to some example embodiments.

FIG. 10 shows an example of a red-lined display to be used determine how to display the media content in circular video content on a display of a computing device.

As explained above, the media content being displayed may be one of a plurality of media content items (e.g., as part of a gallery). The media content may include videos, images (e.g., photographs or other images), and the like. The videos may include conventional video formats and circular video format. A gallery may comprise a plurality of media content items of different types and formats. The display of media content items in a gallery may automatically transition to the next media content item in the gallery or a user may skip to the next media content item via gesture, controls, or other means for indicating that he wishes to view the next media content item in the gallery.

In one example, if a user is viewing a media content item that was captured in a circular video format and the media content item finishes or the user taps or otherwise indicates to proceed to the next media content item in the gallery, if the next media content item was also captured in circular video format, the next media content item will be displayed to the user in the same mode as the previous media content item. For example, if the user is pinching the previous media content item the next media content item will continue to appear the same at the exact same size, rotation, parallax, and so forth, as the previous media content item as the user continues pinching. In other words, the pinch gesture would not be interrupted.

Figure 11:
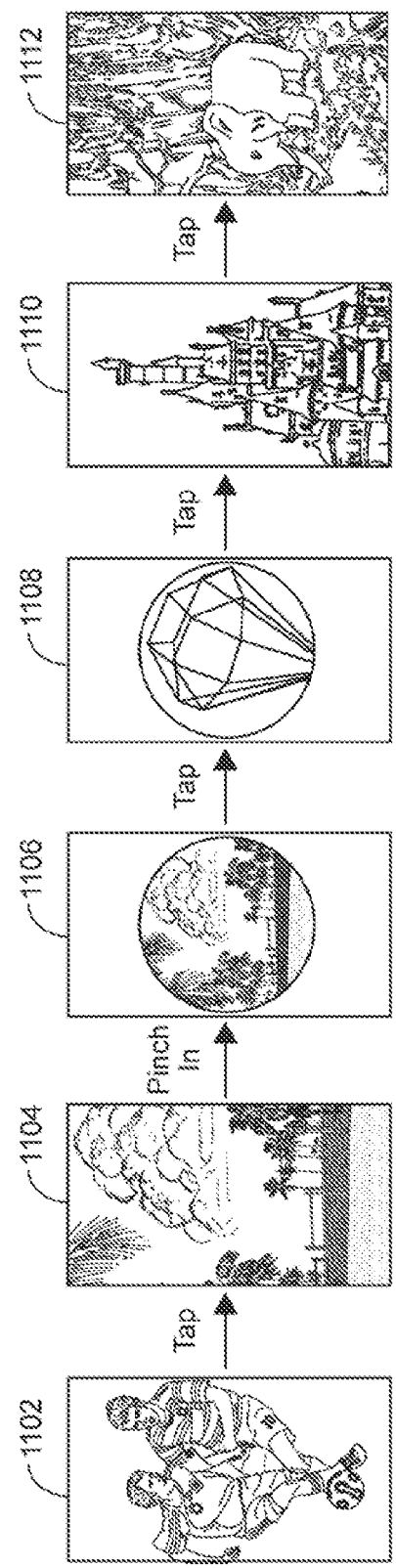
FIG. 11 illustrates example displays on a computing device, according to some example embodiments.

In another example, a media content item remains in the pinched mode until the user finishes viewing the media content item in fullscreen or until a non-circular video format media content item appears or the user selects another story or gallery. FIG. 11 shows an example flow of media content items in a gallery. For example, a user may be viewing a first media content item 1102 in a plurality of media content items in a gallery. The first media content item 1102 may be in a conventional video format (e.g., not in a circular video format). A user may tap to move to the second media content item 1104. The second media content item 1104 may be a video in circular video format that is displayed in fullscreen mode. The user may pinch in to view the second media content item in pinched mode 1106. The user may tap to move to the third media content item 1108 which may also be a video in circular video format. The third media content item 1108 would also be displayed in pinched mode. The user may tap to move to a fourth media content item 1110. The fourth media content item 1110 may be in a conventional video format and thus, is displayed in regular fullscreen mode. The user may tap to move to a fifth media content item 1112 which may be a video in circular video format. The fifth media content item 1112 is displayed in fullscreen mode.

In another example, a media content item retains its viewing mode for the entire viewing session. For example, if a user taps back to view a previous media content item, the previous media content item appears in whatever mode (e.g., pinched mode or fullscreen mode) it was visible in when the user last viewed it during the viewing session. In another example, if a user is viewing a media content item in pinched mode in a first gallery and then goes to a second gallery, and then returns to the first gallery, the media content item would still be displayed in pinched mode.

In another example, if the user decides to exit viewing the media content, the media content item may shrink and a black background fades linearly as the media content item shrinks. In another example, a user may not pinch in or out on a media content item until it is loaded.

Figure 12:
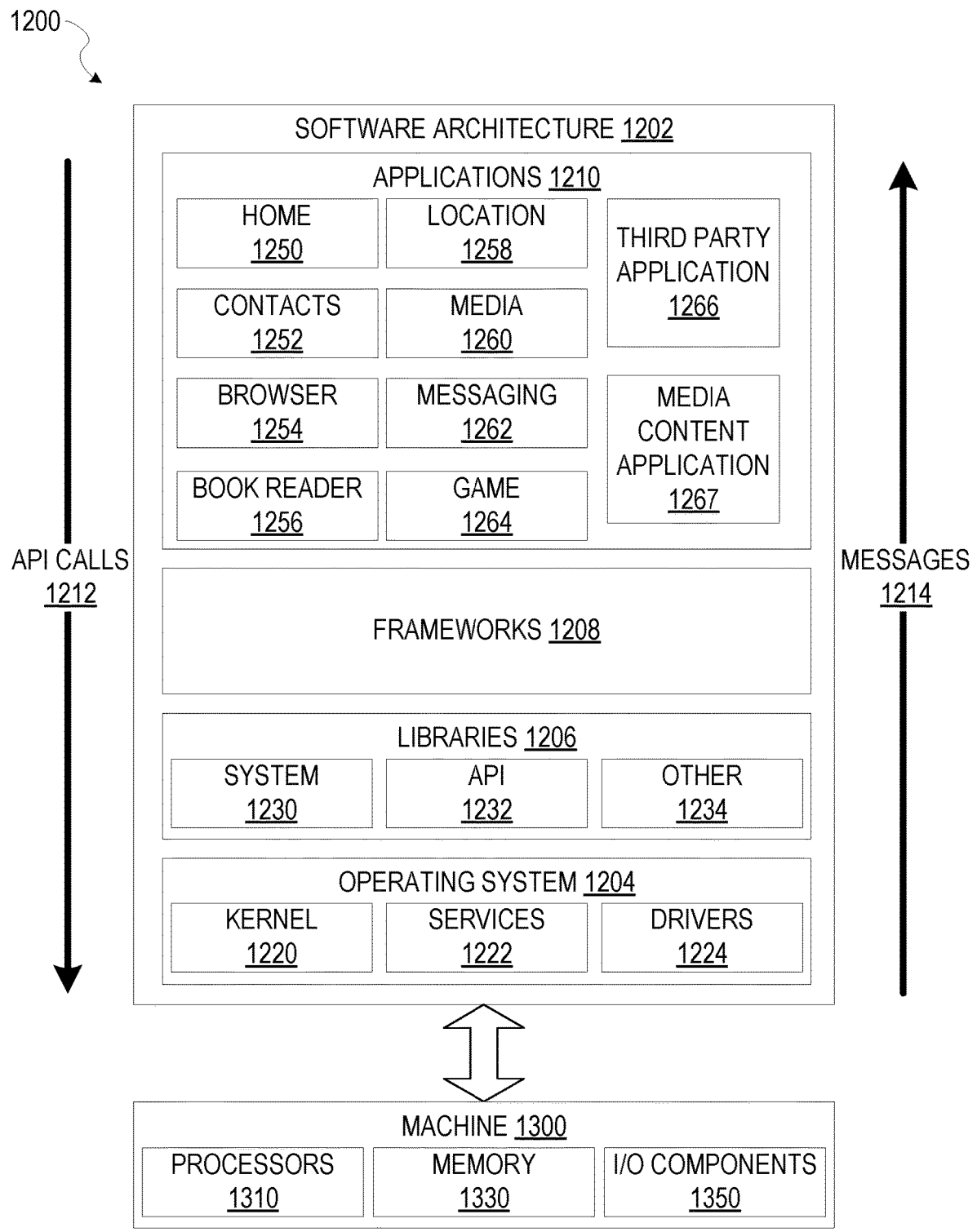
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and server systems 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application(s) 1266 and media content application 1267. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1266 can invoke the API calls 1212 provided by the operating system 1204 to facilitate functionality described herein.

As explained above, some embodiments may particularly include a messaging application 1262. In certain embodiments, this may be a stand-alone application that operates to manage communications with a server system such as server system 102. In other embodiments, this functionality may be integrated with another application such as a media content application 1267. Messaging application 1262 may request and display various media content items and may provide the capability for a user to input data related to media content items via a touch interface, keyboard, or using a camera device of machine 1300, communication with a server system via I/O components 1350, and receipt and storage of media content items in memory 1330. Presentation of media content items and user inputs associated with media content items may be managed by messaging application 1262 using different frameworks 1208, library 1206 elements, or operating system 1204 elements operating on a machine 1300.

Figure 13:
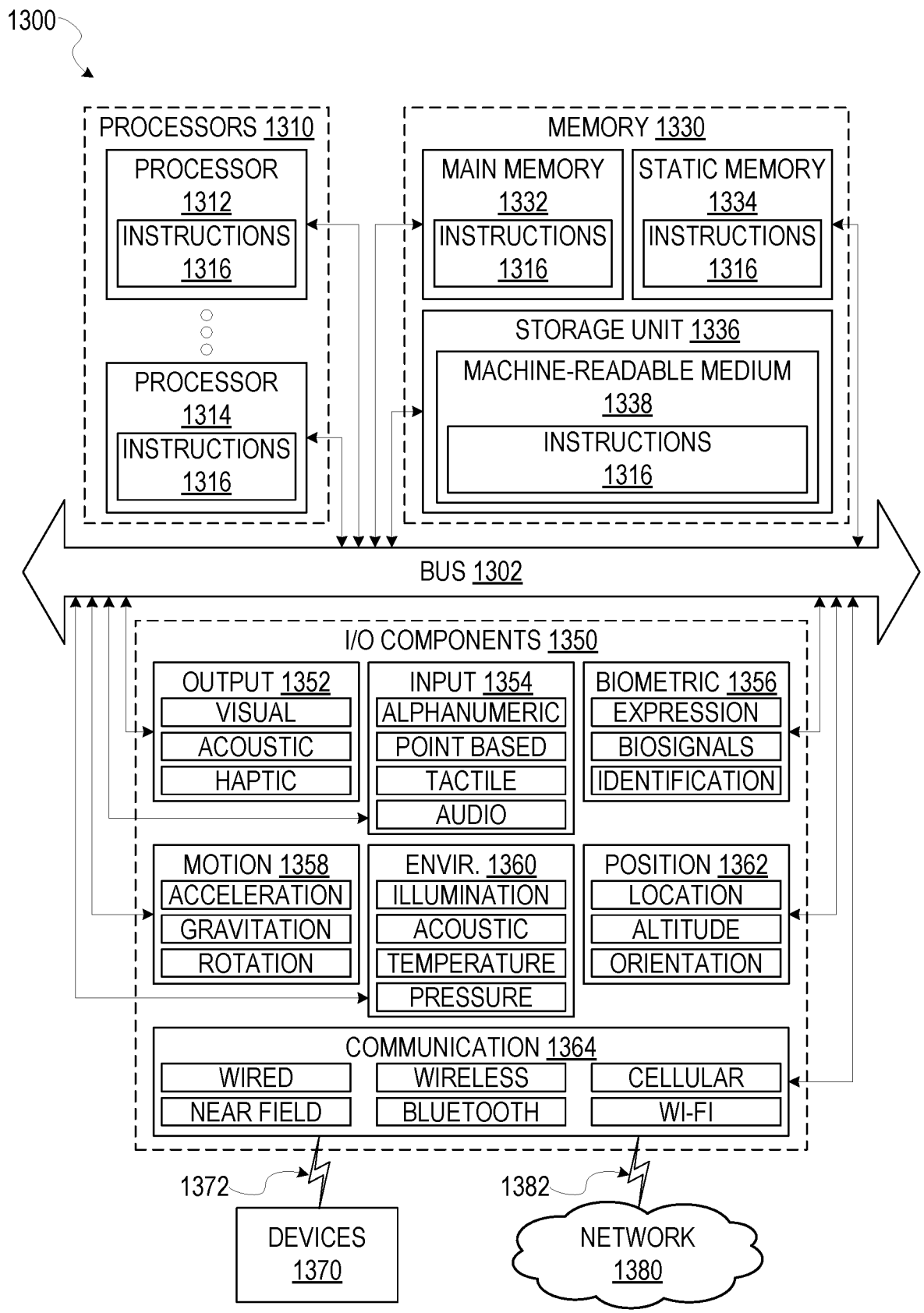
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine 102, 120, 122, 124, etc. or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1310, 1312 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   displaying, by a computing device, a first portion of a circular video that was captured in a circular video format, the first portion comprising of an area of the circular video that fits in a display area of the computing device and excluding an area of the circular video that does not fit in the display area of the computing device;
   detecting, by the computing device, movement of the computing device during playback of the first portion of the circular video;
   receiving, by a computing device, movement data from one or more sensors of the computing device;
   analyzing, by the computing device, the movement data to determine a direction of movement;
   calculating a rotation of the display of the first portion of the circular video based on the direction of movement; and
   causing the display of the first portion of the circular video to slide in a direction opposite to the direction of movement up to an edge of a predefined region, the predefined region being larger than the display area of the computing device and smaller than the circular video, to display a second portion of the circular video, the second portion comprising an area of the circular video including a sub-portion of the first portion of the circular video and an area that was not visible in the first portion of the circular video.

2. The method of claim 1, wherein the one or more sensors comprise at least one or an accelerometer sensor, a gyroscope sensor, and a gravity sensor.

3. The method of claim 1, wherein the movement data is received from an accelerometer sensor and wherein the movement data comprises the computing device's orientation including the rotation of the computing device's axes relative to the downward force of gravity.

4. The method of claim 3, wherein the computing device's orientation further comprises the computing device's rotation around its z-axis directed away from the display area of the computing device.

5. The method of claim 1, wherein the movement data is received from an accelerometer sensor and a gyroscope sensor, and the method further comprises:
   determining that the computing device is held in a flat orientation; and
   calculating the rotation of the display of the first portion of the circular video based on the movement data from the gyroscope sensor.

6. The method of claim 1, wherein the movement data is received from an accelerometer sensor and a gyroscope sensor, and the method further comprises:
   determining that the computing device is held in a nearly flat orientation; and
   calculating the rotation of the display of the first portion of the circular video based on the movement data from both the accelerometer sensor and the gyroscope sensor.

7. The method of claim 1, wherein the circular video was originally captured using a circular wide angle lens.

8. The method of claim 1, further comprising:
   receiving pinch gesture data from the computing device operating system;
   analyzing the pinch gesture data to determine a pinch scale and a pinch velocity;
   calculating a display size of the circular video based on the pinch scale and pinch velocity; and
   causing the circular video to display based on the display size.

9. The method of claim 1, wherein the first portion of the circular video comprise a media overlay, and wherein the media overlay rotates with the first portion of the circular video when the display of the first portion of the circular video is rotated relative to the direction of movement.

10. The method of claim 1, wherein the first portion of the circular video slides at a decelerating rate as it moves out towards an edge of the circular video and slides at a constant rate as it moves toward a center portion of the circular video.

11. The method of claim 1, wherein the first portion of the circular video slides following a quadratic curve when sliding out from a center of the circular video and follows a linear curve when moving towards the center of the circular video.

12. The method of claim 1, wherein the first portion of the circular video slides at a rate of a specified radians per second.

13. The method of claim 1, wherein the size of the predefined region is determined based on a diameter of the circular video.

14. A computing device comprising:
   a processor; and
   a computer readable medium coupled with the processor, the computer readable medium comprising instructions stored thereon that are executable by the processor to cause a computing device to perform operations comprising:
   displaying a first portion of a circular video that was captured in a circular video format, the first portion comprising of an area of the circular video that fits in a display area of the computing device and excluding an area of the circular video that does not fit in the display area of the computing device;
   detecting movement of the computing device during playback of the first portion of the circular video;

receiving movement data from one or more sensors of the computing device;

analyzing the movement data to determine a direction of movement;

calculating a rotation of the display of the first portion of the circular video based on the direction of movement; and causing the display of the first portion of the circular video to slide in a direction opposite to the direction of movement up to an edge of a predefined region, the predefined region being larger than the display area of the computing device and smaller than the circular video, to display a second portion of the circular video, the second portion comprising an area of the circular video including a sub-portion of the first portion of the circular video and an area that was not visible in the first portion of the circular video.

15. The computing device of claim 14, wherein the movement data is received from an accelerometer sensor and wherein the movement data comprises the computing device's orientation including the rotation of the computing device's axes relative to the downward force of gravity, and wherein the computing device's orientation further comprises the computing device's rotation around its z-axis directed away from the display of the computing device.

16. The computing device of claim 14, wherein the movement data is received from an accelerometer sensor and a gyroscope sensor, and the operations further comprise:

determining that the computing device is held in a flat orientation; and calculating the rotation of the display of the first portion of the circular video based on the movement data from the gyroscope sensor or calculating the rotation of the display of the first portion of the circular video based on the movement data from both the accelerometer sensor and the gyroscope sensor.

17. The computing device of claim 14, wherein the movement data is received from a gyroscope sensor, and the operations further comprise:

determining that the computing device is held in a nearly flat orientation; and calculating the rotation of the display of the first portion of the circular video based on the movement data from the gyroscope sensor.

18. The computing device of claim 14, wherein the circular video was originally captured using a circular wide angle lens.

19. The computing device of claim 14, the operations further comprising:

receiving pinch gesture data from the computing device operating system;

analyzing the pinch gesture data to determine a pinch scale and a pinch velocity;

calculating a display size of the circular video based on the pinch scale and pinch velocity; and causing the circular video to display based on the display size.

20. A non-transitory computer readable medium comprising instructions stored thereon that are executable by at least one processor to cause a computing device to perform operations comprising:

displaying a first portion of a circular video that was captured in a circular video format, the first portion comprising of an area of the circular video that fits in a display area of the computing device and excluding an area of the circular video that does not fit in the display area of the computing device;

detecting movement of computing device during playback of the first portion of the circular video;

receiving movement data from one or more sensors of the computing device;

analyzing the movement data to determine a direction of movement;

calculating a rotation of the display of the first portion of the circular video based on the direction of movement; and causing the display of the first portion of the circular video to slide in a direction opposite to the direction of movement up to an edge of a predefined region, the predefined region being larger than the display area of the computing device and smaller than the circular video, to display a second portion of the circular video, the second portion comprising an area of the circular video including a sub-portion of the first portion of the circular video and an area that was not visible in the first portion of the circular video.

* * * * *

UNITED STATES PATENT AND TRADEMARK OFFICE
CERTIFICATE OF CORRECTION

Page 1 of 1

PATENT NO. : 10,564,425 B2
APPLICATION NO. : 15/673215
DATED : February 18, 2020
INVENTOR(S) : Bamberger et al.

It is certified that error appears in the above-identified patent and that said Letters Patent is hereby corrected as shown below:

In the Claims

Column 22, Line 34, Claim 9, delete "comprise" and insert --comprises-- therefor Column 24, Line 24, Claim 20, after "of", insert --the--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*